(12) United States Patent
Pinchen et al.

(10) Patent No.: US 7,766,245 B2
(45) Date of Patent: *Aug. 3, 2010

(54) VIRTUAL CODE WINDOW

(75) Inventors: Stephen Paul Pinchen, Derbyshire (GB); Jens Jacob Juul Rasmussen, Hellerup (DK)

(73) Assignee: Fracture Code Corporation Aps, Kastrup (DK)

( * ) Notice: Subject to any disclaimer, the term of this patent is extended or adjusted under 35 U.S.C. 154(b) by 28 days.

This patent is subject to a terminal disclaimer.

(21) Appl. No.: 12/024,735

(22) Filed: Feb. 1, 2008

(65) Prior Publication Data

US 2008/0185445 A1  Aug. 7, 2008

(30) Foreign Application Priority Data

Feb. 2, 2007   (GB) .................................. 0702090.2

(51) Int. Cl.
*G06K 19/06* (2006.01)
(52) U.S. Cl. .................. 235/494; 235/435; 235/487
(58) Field of Classification Search ............. 235/462.1, 235/491, 494; 713/176, 179
See application file for complete search history.

(56) References Cited

U.S. PATENT DOCUMENTS

| 6,357,656 | B1 * | 3/2002 | Puff ........................... 235/382 |
| 2005/0047593 | A1 * | 3/2005 | Hampp ........................ 380/54 |
| 2006/0011504 | A1 * | 1/2006 | Gosebruch et al. ....... 206/459.5 |
| 2009/0033914 | A1 * | 2/2009 | Doublet ...................... 356/71 |
| 2009/0074231 | A1 * | 3/2009 | Rancien ..................... 382/100 |

FOREIGN PATENT DOCUMENTS

| EP | 0528521 A2 | 2/1993 |
| GB | 2383878 A | 7/2003 |
| WO | 2005/080088 A1 | 9/2005 |

OTHER PUBLICATIONS

Search Report under Section 17 dated May 27, 2008.

\* cited by examiner

*Primary Examiner*—Michael G Lee
*Assistant Examiner*—Keith Goodman, Jr.
(74) *Attorney, Agent, or Firm*—Banner & Witcoff, Ltd

(57) ABSTRACT

A machine readable code is defined by a portion of graphical indicium located on a substrate; wherein the code is delimited by a temporary boundary that is generated by a reading machine relative to a fixed trigger point only when the code is being read.

4 Claims, 7 Drawing Sheets

VIRTUAL CODE WINDOW

The present invention relates to graphic codes and in particular graphic codes that are defined by a code window.

Codes that are graphically represented and machine-readable are well-known. Such codes are commonly used on consumer and commercial products and when read may provide information relating to the cost, line item, or origin of the product, for example. These types of codes may be used for automating check-outs at supermarkets, for stock control purposes or for verifying the correct product is in the correct packaging. More complex machine-readable codes of this type can be used as a security feature on certain consumer products such as pharmaceuticals, alcohol, tobacco and the like or for documents of high value such as currency, bonds, tax stamps, travel documents and identification cards to prevent counterfeiting, pass-off and diversion. There are a number of different types of code formats commonly in use; these include alphanumerics, linear barcodes and two-dimensional barcodes. However, these types of codes are relatively simple to copy. It may also be possible to guess the next code within a sequence since the algorithms used to generate such codes are in the public domain. Also, information is encoded within the code, and even if the data is encrypted, the information can be derived from the code without reference to any database. The data may be used or manipulated for unauthorised purposes; which greatly reduces the effectiveness of such codes as security or track and trace devices.

One sophisticated type of machine-readable code is described in our UK Patent no GB 2383878 (the entire contents of which are incorporated herein by reference) and commercially available under the trademark FractureCode®. Advantages of this type of code over other commercial machine-readable codes include the ability to generate a very high number of random unique codes. Another major advantage is that the code itself carries no data and no data is required to generate the code at the time of the code is printed. This renders the code meaningless until the moment it is used.

Articles, such as documents of value and consumer products, such as those already mentioned, or their packaging, are marked with such codes. In order to obtain information about an article bearing a code, the code must be read by a machine, which first performs a scanning operation to acquire digitally an image of the code. The image is then processed electronically to derive, via application of an algorithm, a unique alphanumeric descriptor that may be used to look up data corresponding to the article in a database.

The code is typically located on the surface of an article and comprises a unique graphical pattern, composed of lines, dots or ellipses or other markings or combinations of these, with an area of the pattern delimited by a rectangular box or some other graphical boundary to form a physical code window. In order to print this unique graphical indicium special printing apparatus must be used.

It is particularly difficult to copy this code for a number a reasons.

Firstly, it is difficult to reproduce the code with the degree of accuracy required, i.e. such that a reading machine would fail to distinguish between the line position of an original code and that of a copy and would generate the same alphanumeric descriptor as would have been generated when scanning the original code. This feature is partly a function of the level of detail of the code.

Secondly many of the codes are no more than 1 mm by 1 mm in area and may be printed in ultraviolet inks, infrared inks or other convert security inks.

A major security advantage of these codes is that without the decoding algorithm the alphanumeric descriptor cannot be deduced. Further, even if the algorithm were to be known, the data corresponding to the alphanumeric descriptor cannot be obtained without access to a secure database.

Although these codes are difficult to copy and guess, since only the area delimited by the rectangular box, or some other graphical boundary, is of any interest, the only portion that needs to be reproduced by any unauthorised user is the code window and the area within it. This means that the whole of the graphical pattern on the substrate need not be copied and any line pattern not within the code window is effectively redundant. Furthermore, someone wishing to read the code without authorisation knows which part of the graphical pattern to look at since it is surrounded by a rectangular box or some other graphical boundary.

A further consideration is that whilst increasing the size of the window would make it more difficult to forge or replicate the code since more code would have to be copied, due to aesthetics the size of the window must be kept small so that it does not interfere with the product graphics on the packaging or data on a document.

WO 2005/080088 discloses an object (e.g. a bank note or a cheque) comprised of a primary identifier. The primary identifier is in the form of a plurality of identification elements embedded in the object, which are visually detectable when illuminated by infrared or ultraviolet electromagnetic radiation but are visually indistinguishable from the rest of the object when illuminated with visible light. The identification elements are randomly distributed so that the positions of the identification elements are practically unique to the object, and the object has a reference point in the form of a printed symbol which defines a sub-area of the object in which at least some of the identification elements are provided. A method and a detector for verifying that such an object is genuine are also described. The object is verified by comparing measured information relating to the positions of the identification elements in the sub-area relative to the reference point, with recorded information of the genuine object.

There are several disadvantages associated with such a system. Firstly, the pattern of the random distribution of identification elements is determined completely by chance. Therefore its uniqueness cannot be guaranteed and unwanted replication cannot be mathematically ruled out. Secondly, the reference point defines an area which is used to identify the object. Although the reference point may not indicate the size and shape of the identifying area, it inevitably suggests the location of this area. Thirdly, if a plurality of identifying areas are desired, for example, for reasons of added security, this can only be achieved by having a plurality of reference points to define the respective identifying areas. This may interfere with the aesthetics of the object, or more importantly, reveal the significance of the reference points to a potential counterfeiter.

It is therefore desirable to provide a code which is even more covert, making it more difficult to copy, tamper with or read without authorisation.

According to a first aspect of the present invention there is provided a machine readable code comprising a portion of a graphical indicium located on a substrate; wherein the code is delimited by a temporary boundary that is generated by a reading machine relative to a fixed trigger point only when the code is being read.

The code may comprise at least one further portion of the graphical indicium delimited by a temporary boundary that is generated by a reading machine relative to a fixed trigger point only when the code is being read.

The position of the or each temporary boundary relative to the trigger point may be stored in the machine. The position of the or each temporary boundary relative to the trigger point may be embodied in a second machine-readable code. The second machine-readable code may be a barcode.

The trigger point may be a graphic marking. The trigger point may be a point on a barcode. The trigger point may be non-symmetrical.

According to a second aspect of the invention there is provided a method of encoding a graphical indicium comprising the steps of: acquiring an image of at least a portion of the graphical indicium; electronically creating a temporary boundary around a portion of the graphical indicium relative to a fixed trigger point; processing the portion of the acquired image that is located within the boundary to produce a descriptor; assigning data to the descriptor; and, storing the association in a storage means.

The method may further include the step of decoding a barcode to determine the location of the temporary boundary relative to the trigger point.

According to a third aspect of the present invention there is provided an apparatus for encoding a graphical indicium comprising: a camera for acquiring an image of at least a portion of the graphical indicium; a detection unit detecting a fixed trigger point; a window calculation unit for electronically creating a temporary boundary around a portion of the graphical indicium relative to the trigger point; a processor for processing the portion of the acquired image that is located within the boundary to produce a descriptor; an assignment unit for assigning data to the descriptor; and, a storage means for storing the association.

The apparatus may further include a barcode decoder for decoding a barcode to determine the location of the temporary boundary relative to the trigger point.

According to a fourth aspect of the present invention there is provided a method of decoding a graphical indicium comprising the steps of: acquiring an image of at least a portion of the graphical indicium; electronically creating a temporary boundary around a portion of the graphical indicium relative to a fixed trigger point; processing the portion of the acquired image that is located within the boundary to produce a descriptor; and, retrieving data associated with the descriptor from a storage means.

The method may further comprise the step of decoding a barcode to determine the location of the temporary boundary relative to the trigger point.

According to a fifth aspect of the present invention there is provided an apparatus for decoding a graphical indicium comprising: a camera for acquiring an image of at least a portion of the graphical indicium; a detection unit detecting a fixed trigger point; a window calculation unit for electronically creating a temporary boundary around a portion of the graphical indicium relative to the trigger point; a processor for processing the portion of the acquired image that is located within the boundary to produce a descriptor; a storage means on which data is stored; and, a retrieval unit for obtaining data relating to the descriptor from the storage means.

The apparatus may further include a barcode decoder for decoding a barcode to determine the location of the temporary boundary relative to the trigger point.

The graphical indicium, or portion thereof, may be unique, and may be abstract. Where the term barcode is used herein, it should be taken to include, but not be limited to such codes as: Data Matrix, PDF-417, Micro-PDF-417, QR Code, Maxi-Code, Codabar, RSS, and linear barcodes.

The present invention may include any combination of the features or limitations referred to herein, except combinations of such features as are mutually exclusive.

Embodiments of the present invention will now be described, by way of example only, with reference to the accompanying drawings, in which.

Figure 1A:
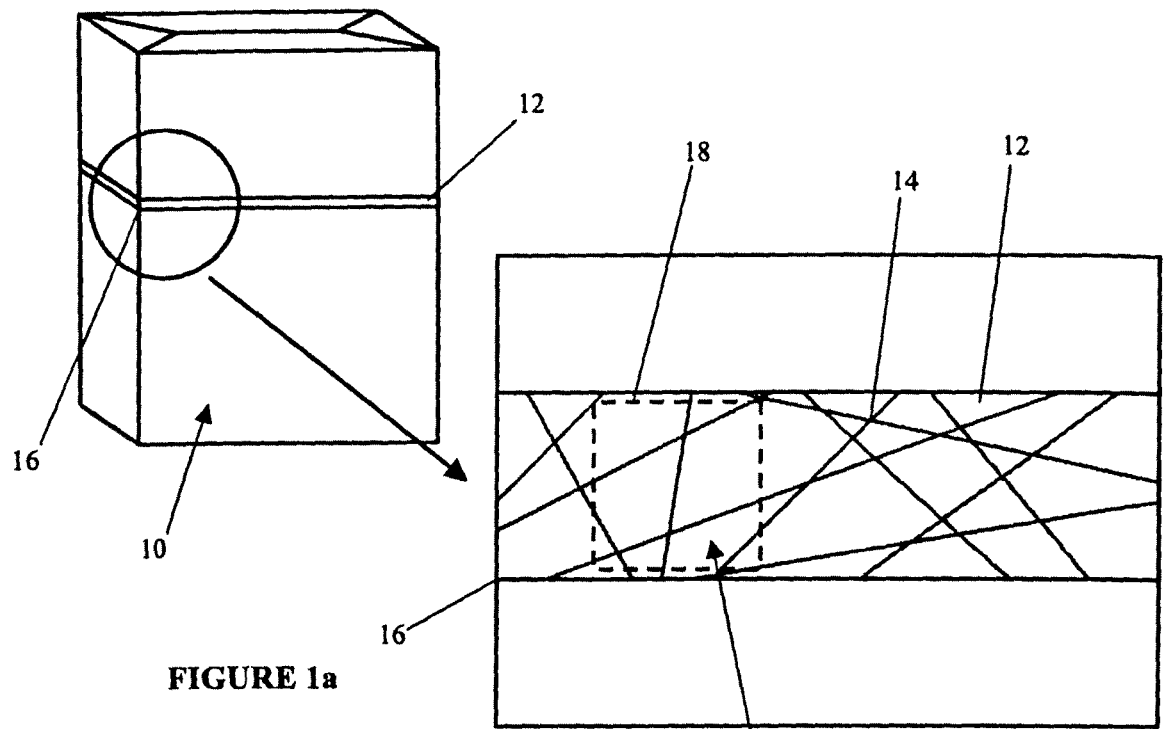
FIGS. 1a and 1b show a code according to a first embodiment of the invention.
Figure 1B:
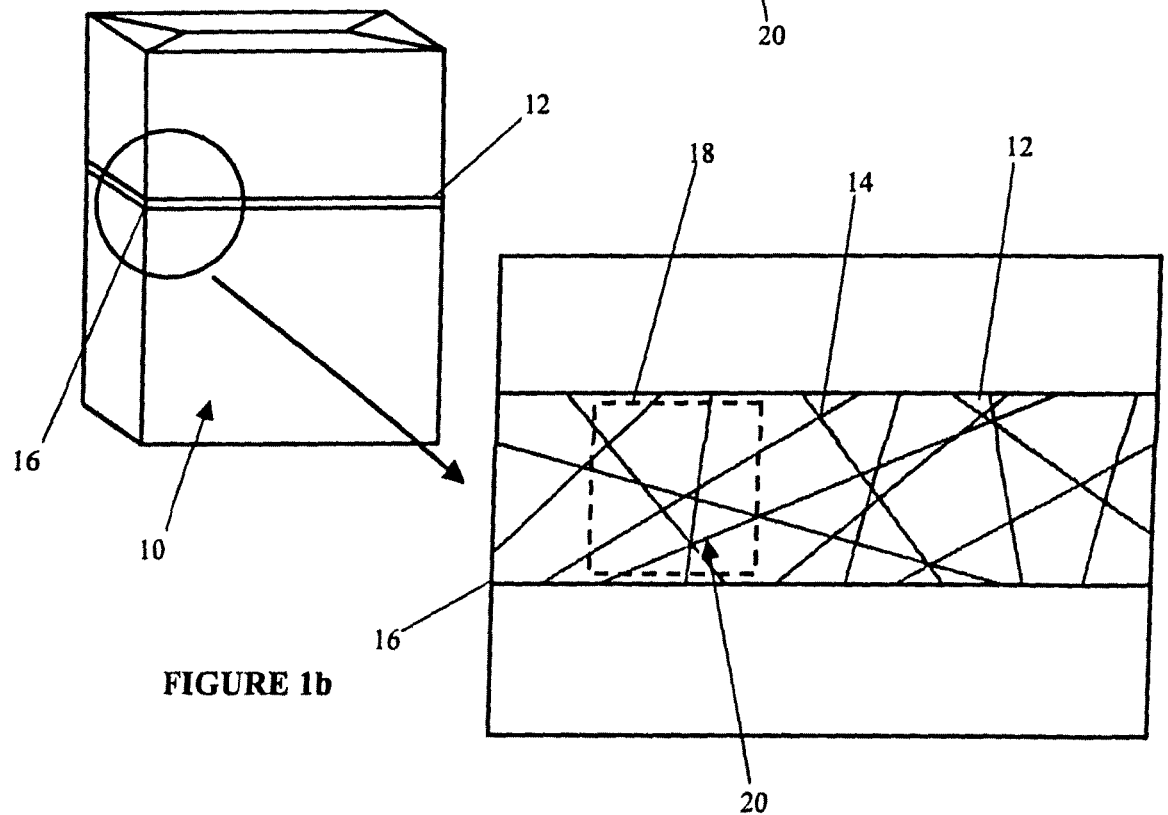

Referring to FIGS. 1a and 1b they show an article 10 overwrapped with filmic packaging with a tear tape 12 arranged on the packaging to enable simple removal of the packaging. The tear tape 12 has a plurality of straight lines 14 printed on it which are arranged at different angles such that at least some of the lines 14 intersect each other. Such a tape can be manufactured for example by a method as is described in our UK Patent no. GB 2383878. The pattern of lines 14 varies continuously and therefore every portion of tear tape 12 has a unique pattern of lines on its surface. Whilst the example is a plurality of intersecting lines, the code may comprise other elements or shapes such as dots, rectangles, ellipses or a combination of such elements and or shapes. At the time of printing, the coding lines 14 have no meaning whatsoever and no data or information is associated with them. A reel of tear tape 12, for example, may therefore be provided which has a unique, abstract graphical indicium 14 printed over its entire surface which carries no meaning. In order for data to be associated with a portion of the coding lines 14 a code window 18 must be defined, the lines must be read, encoded and then have data assigned to them. The coding lines 14 may be printed using either conventional inks or covert inks, such as are detectable only when illuminated, or irradiated, with light of a certain frequency range.

Figure 2:
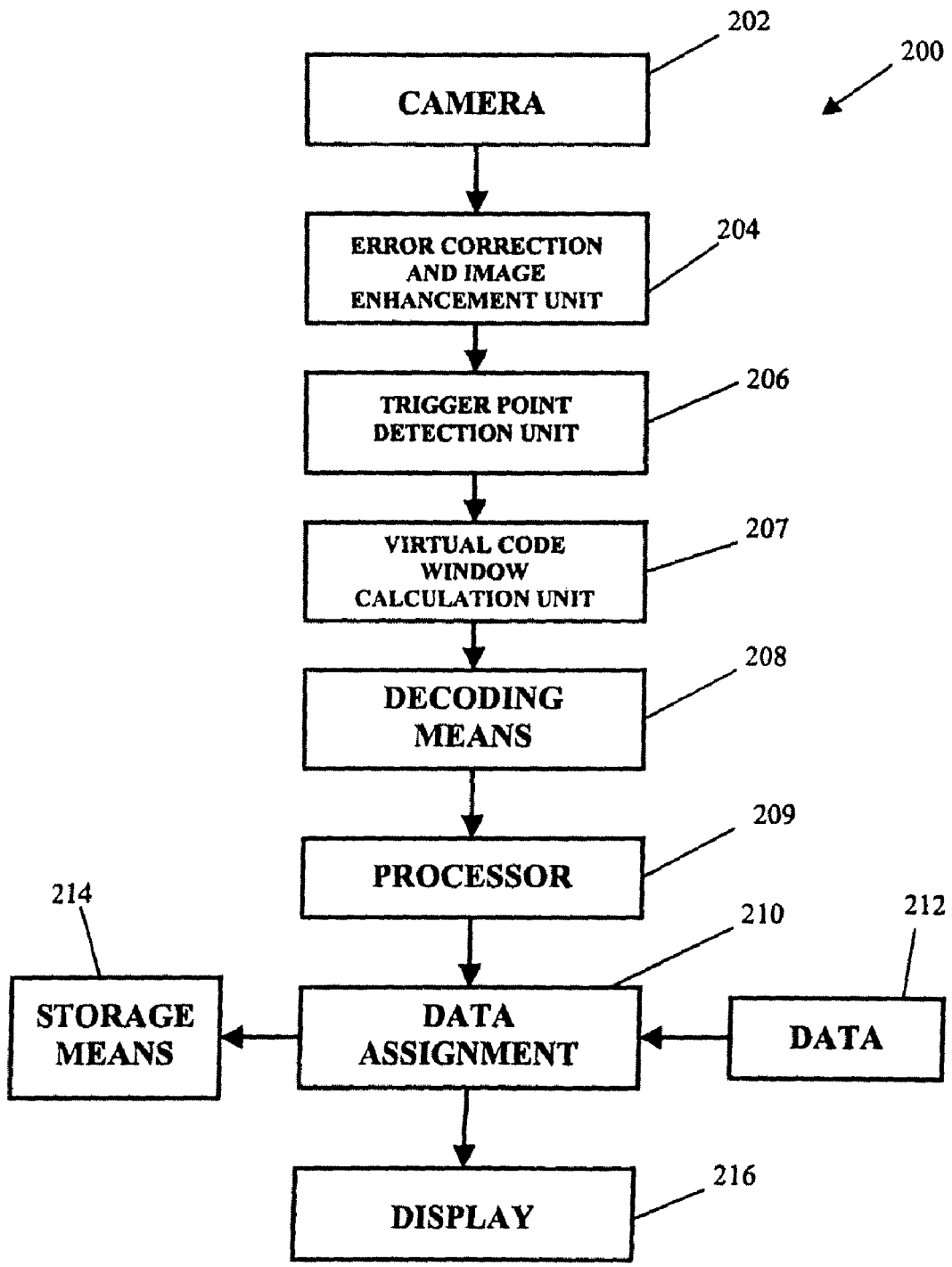
FIG. 2 shows schematically an apparatus for assigning data to a code according to a first embodiment of the invention.

FIG. 2 shows a schematic diagram of an apparatus 200 for reading the coding lines 14, encoding a portion of them and assigning data thereto. A camera 202 acquires an image of the coding lines 14. The acquired image is error-corrected and enhanced electronically in an error correction and image enhancement unit 204. The detection unit 206 then detects a pre-determined trigger point 16 on the tear tape 12 or article 10. The trigger point 16 may be the corner of the article 10, a non-symmetrical mark or dot on the article 10 or tear tape 14, an existing graphic on the article or any other machine readable point. The trigger point 16 may be printed using either conventional inks or covert inks. Based on pre-defined co-ordinates, a virtual code window 18 of a specified size and shape is then created around a portion of the coding lines 14 relative to the trigger point 16 by a window calculation unit 207. The co-ordinates of the virtual code window 18 relative to the trigger point 16 are defined by the machine 200 and the position of the virtual code window is therefore the same for every article 10 that is scanned. However, the pattern of the coding lines 14 within the virtual window 18 is unique for each article. This is illustrated in FIGS. 1a and 1b. The decoding means 208 then processes the code 20, which is the portion of the coding lines 14 delimited by the virtual code window 18, and the processor 209 applies an algorithm to produce an alphanumeric descriptor 22. A data assignment unit 210 then obtains data 212 which is to be associated with the particular article 10 and the alphanumeric descriptor 22 and data relevant to the article 10 are associated with each other in a storage means 214. The data 212 and alphanumeric descriptor 22 may be displayed on a display means 216.

Figure 3:
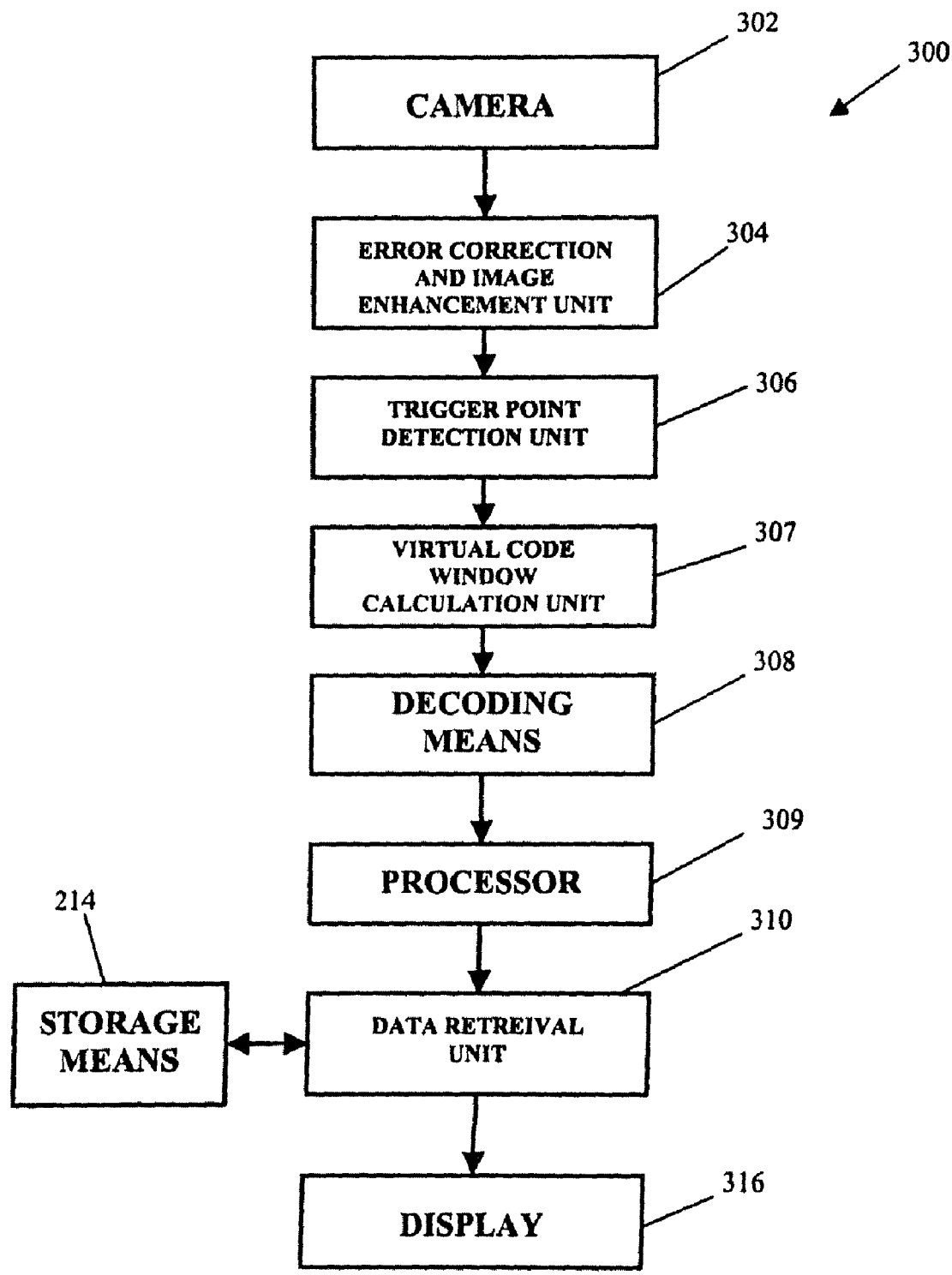
FIG. 3 shows schematically an apparatus for reading a code according to a first embodiment of the invention.

FIG. 3 schematically shows a hand-held reading apparatus 300 for reading the code 20 on an article 10. A camera 302 acquires an image of the coding lines 14 and the acquired image is error-corrected and enhanced electronically in an error correction and image enhancement unit 304. The detection unit 306 detects the pre-determined trigger point 16 and the window calculation unit 307 creates the virtual code window 18 of a specified shape and size relative to it based on the pre-defined co-ordinates. The virtual code window 18 is in the same position as when the article was initially scanned. The decoding means 308 then processes the code 20, which is the portion of the coding lines 14 delimited by the virtual code window 18, and the processor 309 applies an algorithm to produce an alphanumeric descriptor 22. A data retrieval unit 310 then obtains data associated with the alphanumeric descriptor 22 from the storage means 214 on which data was stored during the encoding process. The display means 316 then displays the data relating to the scanned article 10.

Having a virtual window 18 within which the code 20 is located means that it is not apparent to those wanting to forge or replicate the code for unauthorised purposes which part of the graphical indicium 14 is being used to produce code 20. Therefore, the whole of the graphical indicium would have to be accurately reproduced in order to forge or replicate the code, which would be very difficult. A further advantage is that someone wanting to read the code 20 without authorisation does not know which part of the graphical indicium 14 to scan since it is not graphically indicated. In addition, because the window 18 is not graphically represented it may be as large as it is desired since it will not interfere with the aesthetics of the article and/or its packaging. This means that even if someone knows which part of the graphical indicium 14 to reproduce, a large area must still be accurately copied making it increasingly difficult.

Figure 4A:
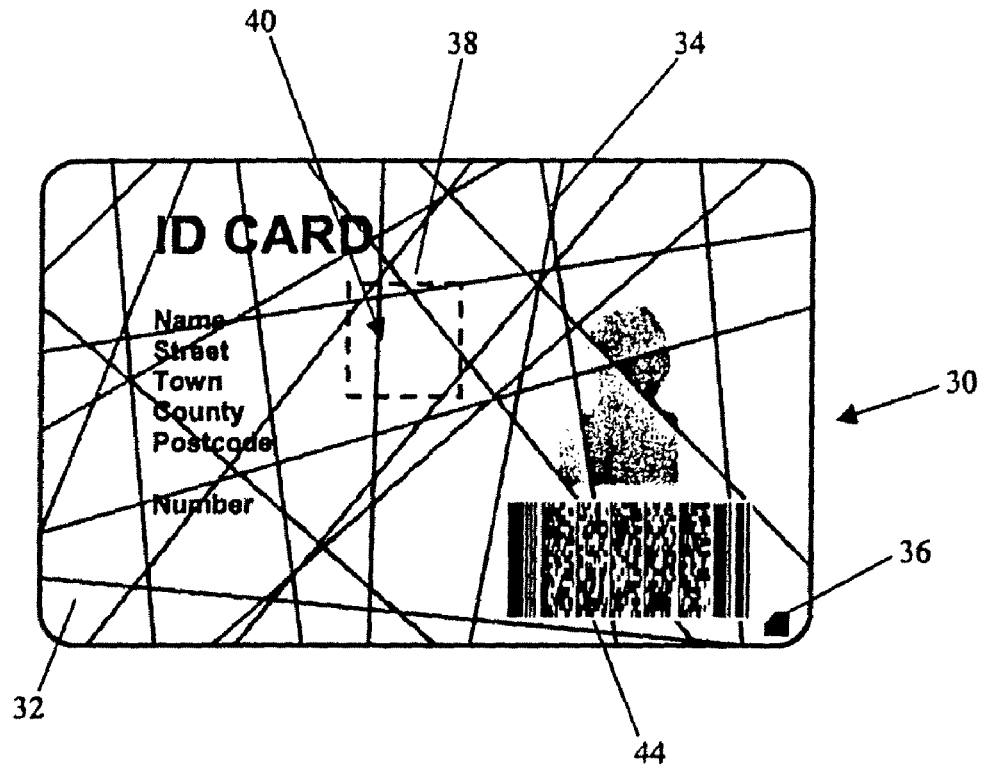
FIGS. 4a and 4b show a code according to a second embodiment of the invention.
Figure 4B:
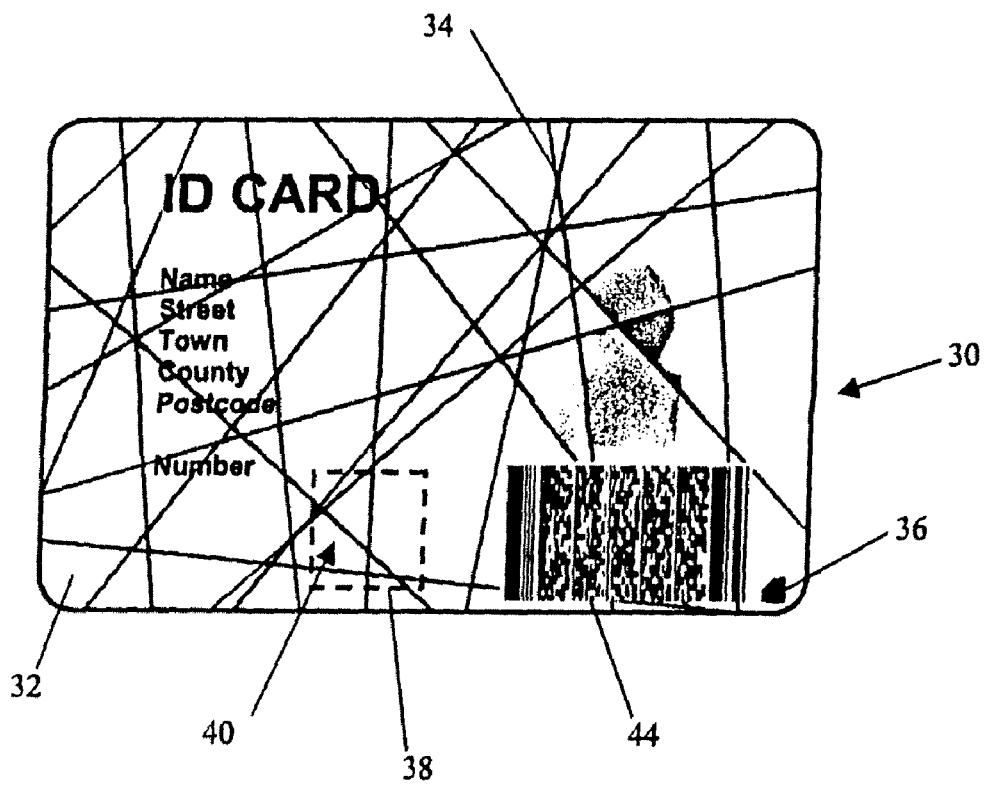

FIGS. 4a and 4b schematically show a second embodiment of the invention. An article 30, in the form of an identification card, has a plurality of straight lines 34 printed over its surface 32 which are arranged at different angles such that at least some of the lines intersect each other. The pattern of coding lines 34 over the surface 32 is fixed for each of a plurality of articles 30 and therefore every article in a series has the same pattern of lines on its surface. Additionally, on the surface 32 of the card 30 is printed a trigger point 36 which in this example is a non-symmetrical mark and a machine readable code 44. The machine readable code may be an alphanumeric code or a barcode, for example. If the machine readable code is a barcode it could be almost any of the currently known codes referred to collectively as "barcodes" and including, but not limited to, such codes as: Data Matrix, PDF-417, Micro-PDF-417, QR Code, MaxiCode, Codabar, RSS, and linear barcodes.

The coding lines 34, trigger point 36 and barcode 44 may be printed using either conventional inks or covert inks, such as are detectable only when illuminated, or irradiated, with light of a certain frequency range. When the coding lines 34 are printed they have no meaning however when the barcode 44 is printed it contains information. The barcode 44 contains, amongst other things, the co-ordinates of a virtual code window 38 relative to the trigger point 36 which may be printed before or after the coding lines 34. The location of the virtual code window 38 is different for each article 30. Thus the code 40, delimited by the virtual code window 38, is unique for each article.

Not only may the barcode 44 vary the positional co-ordinates of the virtual code window 38 but it may vary the size, shape and/or number of virtual windows defining the code 40. For example, the barcode 44 may define two windows, one circular and one rectangular, that are located in different positions relative to a trigger point 36. Furthermore, the barcode 44 may contain an alphanumeric character string which may be used to look-up the co-ordinates and/or other properties of the virtual code window in a database as opposed to the co-ordinates being carried within the barcode 44 itself.

Figure 5:
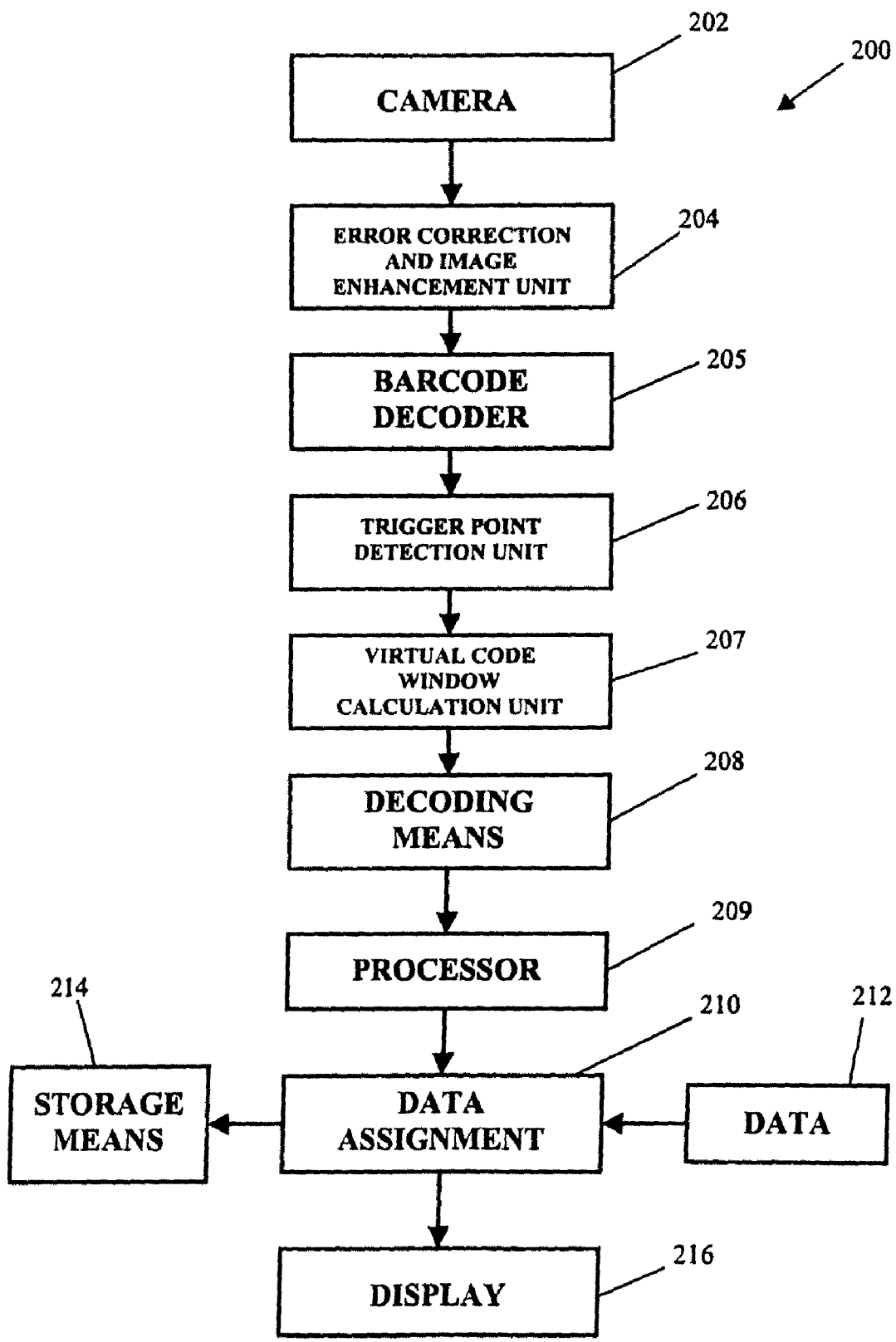
FIG. 5 shows schematically an apparatus for assigning data to a code according to a second embodiment of the invention.

Referring to FIG. 5, an apparatus 200 for reading the coding lines 34 and assigning data thereto is schematically shown. This is substantially the same as the apparatus shown in FIG. 2 except there is a barcode decoder 205. The method for assigning data to the code 40 is the same as for the first embodiment except the co-ordinates of the virtual code window 38 are determined by decoding the barcode 44 on the article as opposed to the co-ordinates being pre-defined in the machine.

Figure 6:
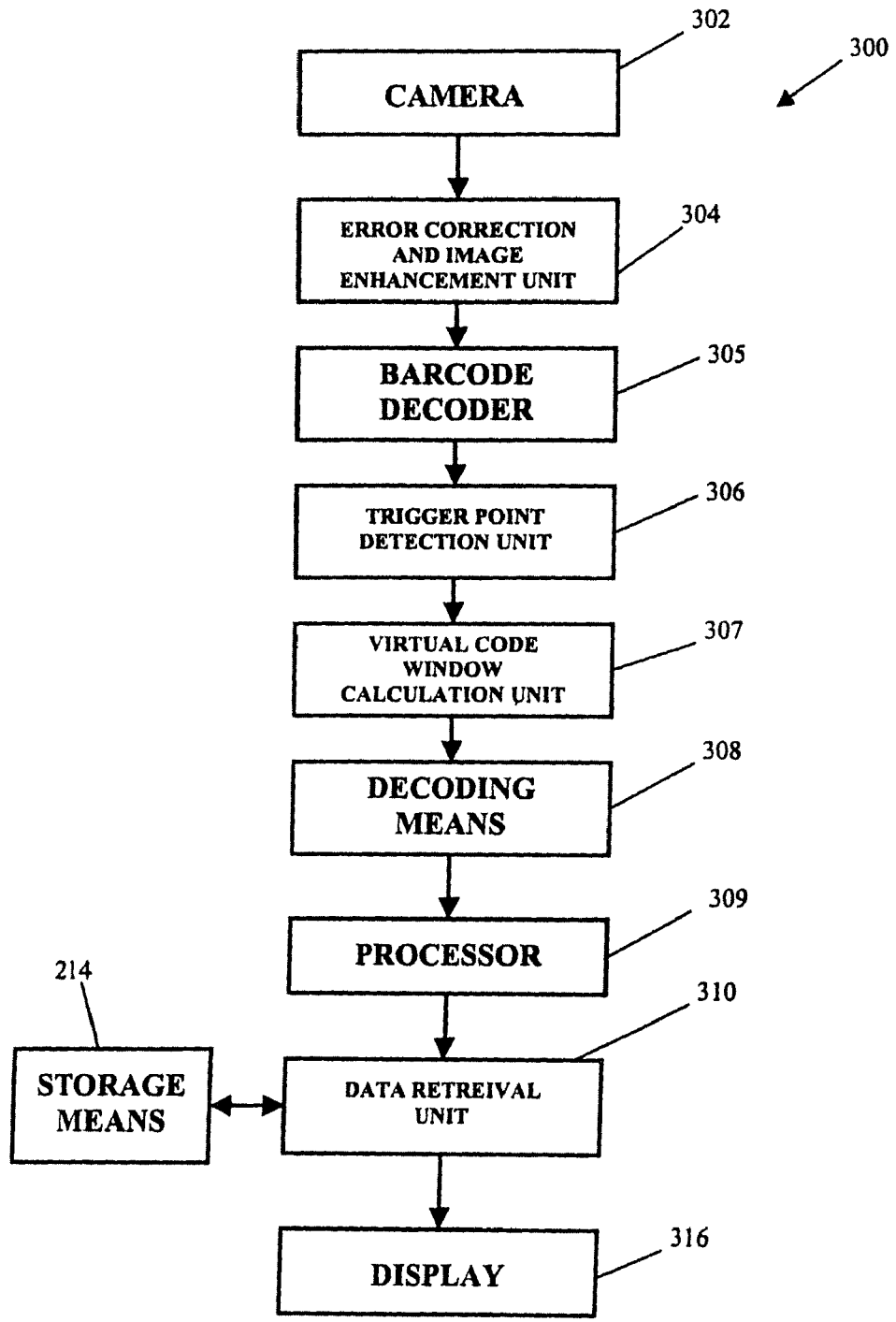
FIG. 6 shows schematically an apparatus for reading a code according to a second embodiment of the invention.

FIG. 6 schematically shows a hand-held reading apparatus 300 for reading the code 40 on an article 30. This is substantially the same as the apparatus shown in FIG. 3 except there is a barcode decoder 305. The method for reading the code 40 is substantially the same as for the first embodiment except scanning the barcode 44 and decoding it determines the co-ordinates of the virtual code window 38 relative to the trigger point 36.

Figure 7A:
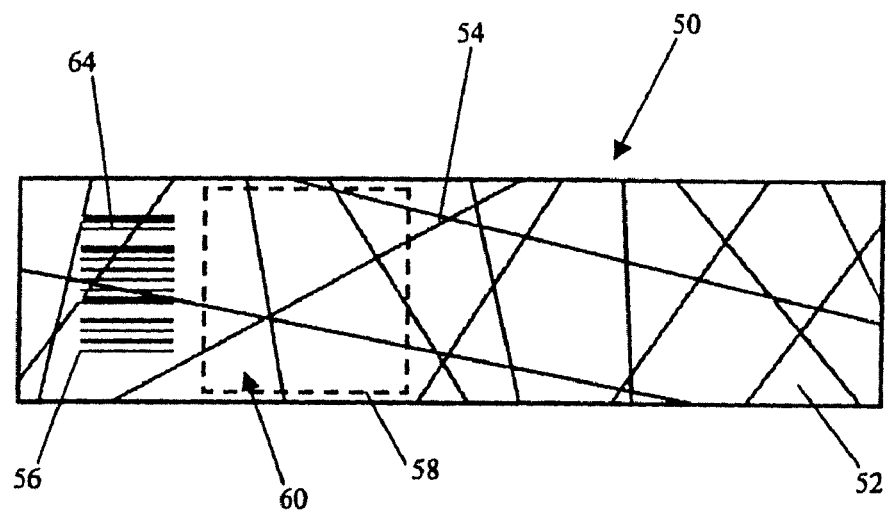
FIGS. 7a and 7b show a code according to a third embodiment of the invention.
Figure 7B:
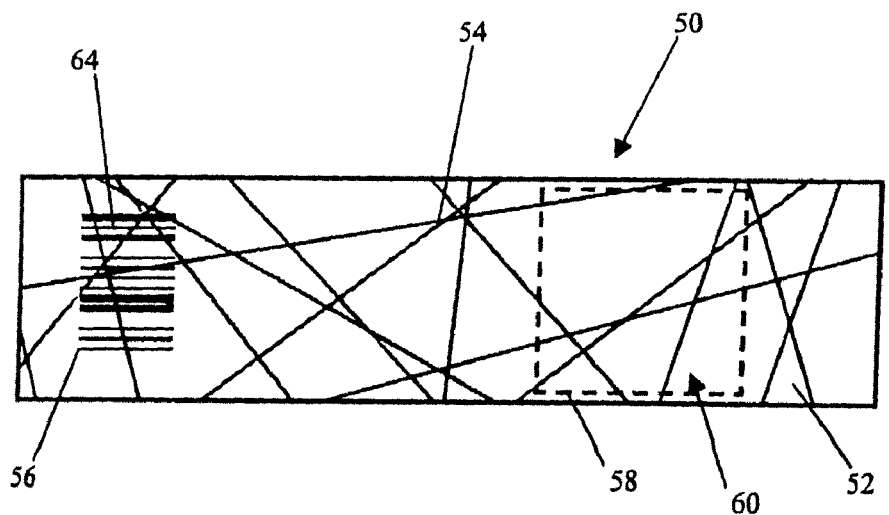

FIGS. 7a and 7b illustrate a third embodiment of the invention. This is substantially the same as the second embodiment except the coding lines 54 located on a substrate 52 vary continuously. One method for achieving this is described in our UK Patent no. GB 2383878. Therefore the coding lines 54 on any portion of the substrate are unique. A barcode 64 is also located on the substrate which contains information as to the location of the virtual code window 58, which defines the code 60, relative to a trigger point 56. The trigger point 56 in this embodiment is the corner of the barcode 64. The code 60 may be assigned data by the apparatus as shown in FIG. 5 and as described for the second embodiment. The code 60 may be read using the apparatus shown in FIG. 6 and as described for the second embodiment.

As opposed to using an ink-printed or ink-sprayed graphical indicium, the graphical indicium may comprise a random arrangement of fibres within a substrate. Such fibres may be incorporated into the substrate during the manufacture process and may be coloured or UV sensitive.

The inks used in the processes described above may be tagged inks which may comprise luminescent and/or phosphorescent compounds or filters such as UV blockers.

The invention claimed is:

1. A method of encoding a graphical indicium to provide individual distinct machine readable codes for a plurality of articles the method comprising the steps of:
   acquiring an image of at least a portion of the graphical indicium;
   electronically creating a temporary boundary around a portion of the graphical indicium relative to a fixed trigger point;
   processing the portion of the acquired image that is located within the boundary to produce a descriptor;
   assigning data to the descriptor; and,
   storing the association in a storage means;
   characterised in that the graphical indicium is fixed for the plurality of articles and the temporary boundary is different for each article, such that the portion of the graphical indicium that forms the code is different for each article.

2. A method according to claim 1, further comprising the step of decoding a barcode to determine the location of the temporary boundary relative to the trigger point.

3. A method of decoding a graphical indicium to provide individual distinct machine readable codes for a plurality of articles comprising the steps of:

acquiring an image of at least a portion of the graphical indicium;

electronically creating a temporary boundary around a portion of the graphical indicium relative to a fixed trigger point;

processing the portion of the acquired image that is located within the boundary to produce a descriptor; and, retrieving data associated with the descriptor from a storage means;

characterised in that the graphical indicium is fixed for the plurality of articles and the temporary boundary is different for each article, such that the portion of the graphical indicium that forms the code is different for each article.

4. A method according to claim 3, further comprising the step of decoding a barcode to determine the location of the temporary boundary relative to the trigger point.

* * * * *